(No Model.) 2 Sheets—Sheet 2.
G. G. AIREY & W. W. UHL.
MARINE VESSEL.
No. 475,172. Patented May 17, 1892.
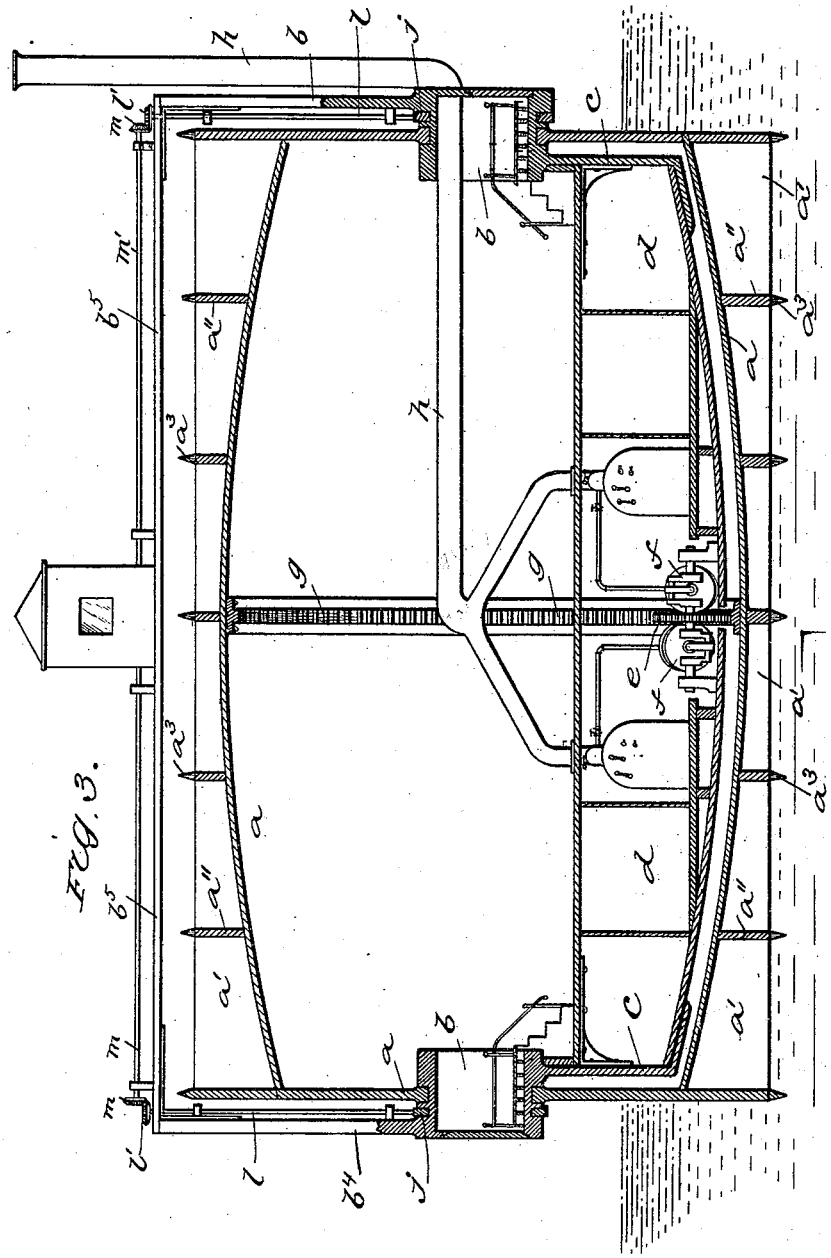
Witnesses
Wm R Davis
E. J. Cussen
Inventors
G. G. Airey
W. W. Uhl
By Alexander Davis
Attorneys

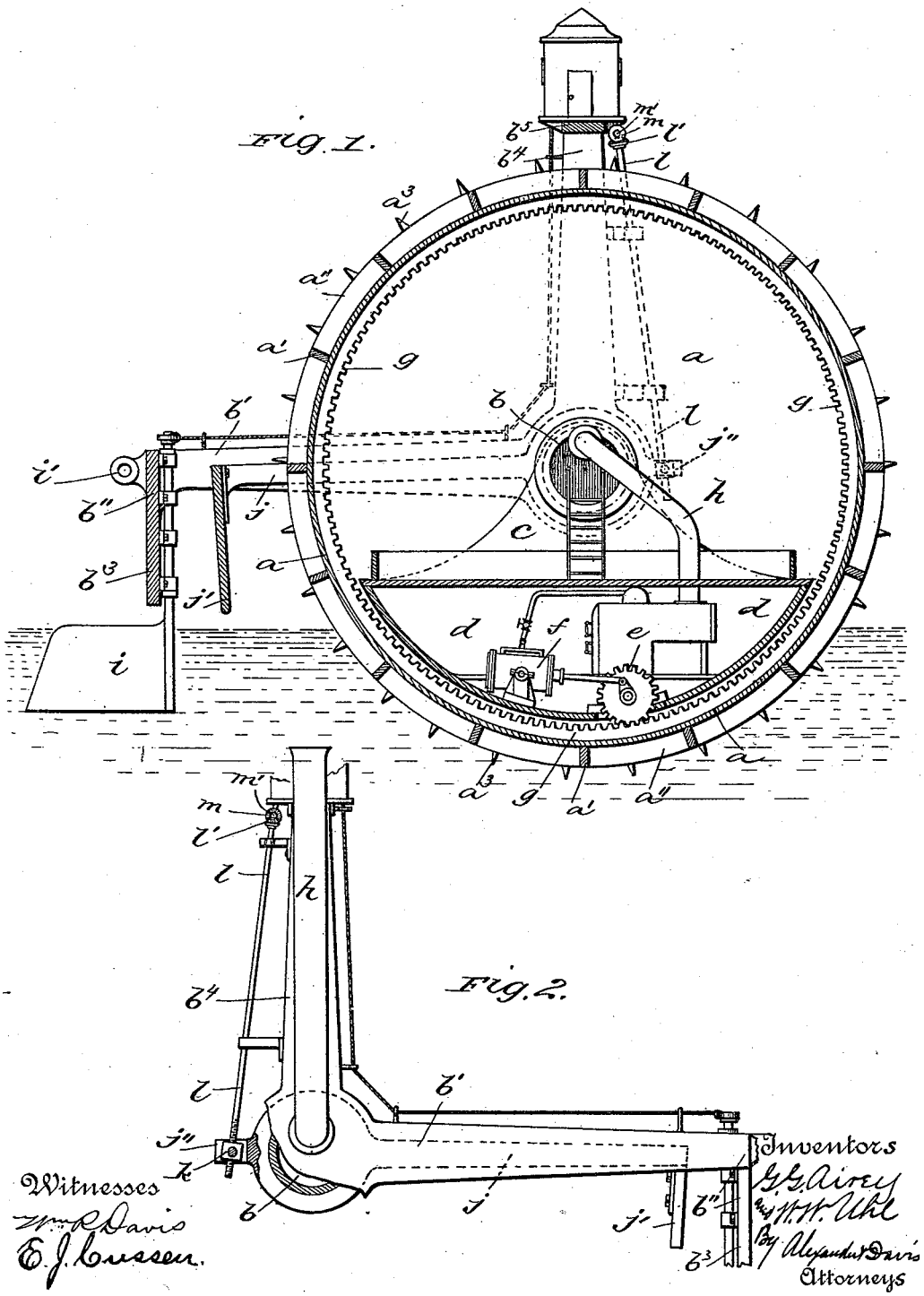

UNITED STATES PATENT OFFICE.

GEORGE G. AIREY AND WILLIAM WALTER UHL, OF MOUNT SAVAGE, MARYLAND.

MARINE VESSEL.

SPECIFICATION forming part of Letters Patent No. 475,172, dated May 17, 1892.

Application filed December 1, 1891. Serial No. 413,673. (No model.)

*To all whom it may concern:*

Be it known that we, GEORGE G. AIREY and WILLIAM WALTER UHL, citizens of the United States, residing at Mount Savage, in the county of Allegany and State of Maryland, have invented certain new and useful Improvements in Marine Vessels, of which the following is a specification, reference being had therein to the accompanying drawings.

This invention relates to improvements in that class of steam-vessels which consist of a revolving cylindrical-shaped hull having paddles or keels secured longitudinally to its outer surface, said hull being supported by hollow shafts, and wherein the habitable part of the vessel is supported from the hollow shafts and within the revolving vessels, all of which will fully hereinafter appear.

The invention has for its object to provide a vessel which may be used for traveling over earth and ice, as well as water, and which will give the greatest amount of power and speed with the least expenditure of steam.

Another of its objects is to provide means whereby the vessel may be very readily and quickly stopped, all of which will be more fully hereinafter described, and particularly pointed out in the claims appended.

In the drawings, Figure 1 is a vertical cross-sectional view of our improved vessel. Fig. 2 is a detail side elevation of a portion of the framing, parts being broken away to more clearly show the construction; and Fig. 3 is a longitudinal vertical sectional view of the vessel.

In the drawings, $a$ designates the hollow revolving hull, which is cylindrical in cross-section and tapered on a curve from its center to its ends. To the convex outer surface of this hull is secured a suitable number of longitudinal ribs or paddles $a'$, the outer edges of which are straight and parallel with a line drawn longitudinally through the center of the vessel, and these paddles are connected and braced by annular flanges $a''$, which are secured to the outer surface of the vessel, their outer edges terminating flush with the outer edges of the paddles. These annular ribs or flanges are provided on their outer edges with radial spikes $a^3$, which facilitate the movement of the vessel over land and ice, as is evident.

The hull $a$ is supported by and revolves on suitable bearings formed on the hollow hubs or shafts $b$. These hollow shafts extend into the vessel a suitable distance and have formed on or rigidly secured to their inner ends the depending segmental hangers $c$, which support the inner stationary hull $d$ of the vessel. This inner hull is approximately semi-cylindrical in cross-section, its outer and curved surface being in close proximity to the inner surface of the hull $a$. This hull supports the habitable structure of the vessel and suitable decks are built in it to support the boilers and engines and driving mechanism. This driving mechanism is located centrally between the ends of the vessel and consists of the pinion $e$, which is supported on a shaft mounted in suitable bearing secured to the hull $d$ and is operated by suitable engines $f\ f$. This pinion projects through an aperture in the hull $d$ and engages the large gear-wheel or rack $g$, which is secured to the interior of and extends entirely around the vessel $a$, so that, as will be readily understood, when the pinion is revolved by the engines $f$ the hull $a$ will revolve and the paddles $a'$ will strike the water successively and force the vessel in the direction desired, the weight of the inner hull $d$ and the mechanism carried thereby keeping it in its normal or horizontal position, as is evident.

The smoke-stack $h$ from the furnaces is carried out through the hollow shaft, as shown, or in any other suitable manner, the outer end of said stack being carried to a suitable height to give the required draft to the furnaces.

To the outer ends of the hollow hubs or shafts are rigidly secured or formed integrally therewith the rearwardly-extending arms $b'$. These arms extend a suitable distance to the rear of the vessel and are connected by the cross-bar $b''$. This cross-bar is provided with the central depending part $b^3$, to the forward side of which is secured the rudder $i$, an eye-loop $i'$ being secured to its rear side, to which a towing-rope may be secured when desired. The upwardly-extending arms $b^4$ are also secured to or formed integral with the outer ends of the shafts $b$, and these arms extend a suitable distance above the vessel and are connected by the cross-bar $b^5$, which extends across the top of the vessel. The pilot-house is secured to this bar in the center thereof, as shown.

Mounted loosely in suitable bearings formed on the hollow hubs or shafts $b$ between the outer ends of same and the outer ends of the vessel $a$ are the rearwardly-extending arms $j$. These arms are between the arms $b'$ and the ends of the vessel $a$ and extend to the rear of the vessel a suitable distance and are connected by the wide downwardly-extending brake-board $j$. The forward ends of these arms are provided with the forked extensions $j''$, between the arms of which are pivoted the threaded nuts $k$. The lower threaded ends of rods $l$ enter these nuts, their upper ends being provided with beveled gears $l'$, which mesh with gears $m$, secured to shafts $m'$. The shafts $m'$ are mounted in bearings secured to the cross-bar $b^5$ and are revolved from the pilot-house by any suitable means, thereby causing, through the medium of the gears $l'$ and threaded rods $l$, the forward ends of the arms $j$ to be raised or lowered, as desired, which will lower the brake-board $j'$ into or raise it from the water, as the exigencies of the case may require.

The rudder may be provided with the usual cross-arm and tiller-ropes may be run from the outer ends of same to the pilot-house, as shown, or any other suitable steering device may be used, if desired.

Entrance is had to the interior of the vessel through the hollow hubs or shafts $b$, as shown in Fig. 2 of the drawings.

The operation of our device will be readily understood from the foregoing, when taken in connection with the accompanying drawings.

Having thus fully described our invention, what we claim, and desire to secure by Letters Patent, is—

1. A rotary vessel consisting of a cylindrical hull tapered from its center to its ends, longitudinal paddles secured to its outer surface, their outer edges being straight, as described, annular flanges secured to the exterior of the hull and connecting said paddles, and means for supporting and revolving said hull, substantially as described, and for the purpose set forth.

2. A rotary vessel consisting of a cylindrical hull tapered from its center to its ends, longitudinal paddles secured to its outer surface, their outer edges being straight, as described, annular radial flanges secured to the outer surface of the hull and connecting the paddles, their outer edges being flush with the outer edges of the paddles, radial spikes secured to the edges of said flanges, stationary hollow hubs or shafts supporting the hull, and means for revolving said hull on said shafts, substantially as described, and for the purpose set forth.

3. A rotary vessel consisting of the cylindrical hull tapered, as described, and provided with the longitudinal paddles, stationary hollow hubs or shafts supporting said hull, downwardly-depending hangers secured to or formed integral with the inner ends of the shafts, the stationary hull supported by the hangers, the pinion $e$, carried by the stationary hull, and gear-wheel $g$, secured to the interior of the revolving hull, and suitable driving mechanism, substantially as described.

4. In a rotary steam-vessel, the combination of the hollow revolving hull, paddles secured to its outer surface, stationary hollow shafts supporting said hull, and means for revolving said hull with a brake, said brake consisting of the arms $j$, mounted in bearings on the hollow shafts, a brake-board connecting their rear ends in the rear of the vessel, and means for raising and lowering said brake-board, substantially as described, and for the purpose set forth.

5. In a rotary steam-vessel, the combination of the hull $a$, provided with the paddles $a'$ and flanges $a''$ and spikes $a^3$, the hollow shafts $b$, the hangers $c$, secured to the inner ends of the shafts, the hull $d$, supported by said hangers, the pinion $e$, gear $g$, and suitable driving mechanism, the brake, and means for raising and lowering said brake, the arms $b'$ and cross-bar $b^2$, supporting the rudder, the rudder and means for operating it, the arms $b^4$ and cross-bar $b^5$, supporting the pilot-house, substantially as described.

In testimony whereof we affix our signatures in presence of two witnesses.

GEORGE G. AIREY.
WILLIAM WALTER UHL.

Witnesses:
C. D. DAVIS,
E. J. CUSSEN.